United States Patent

[11] 3,556,376

| [72] | Inventor | Hermann Friedrich Offterdinger |
| | | Burlington, Ontario, Canada |
| [21] | Appl. No. | 805,775 |
| [22] | Filed | Mar. 10, 1969 |
| [45] | Patented | Jan. 19, 1971 |
| [73] | Assignee | Entarea Investment Management Ltd. |
| | | Oakville, Ontario, Canada |

[54] HITCH FEED
17 Claims, 6 Drawing Figs.

[52] U.S. Cl. .................................................. 226/151, 226/165, 294/102

[51] Int. Cl. ....................................................... B65h 17/32

[50] Field of Search ........................................ 226/165, 166, 167, 162, 146, 147, 151; 294/102

[56] References Cited
UNITED STATES PATENTS

| 2,291,065 | 7/1942 | Walker | 226/166X |
| 2,586,536 | 2/1952 | Haller | 226/162X |
| 2,696,380 | 12/1954 | Adams | 226/165 |
| 2,810,573 | 10/1957 | Nadel | 226/151 |

FOREIGN PATENTS

| 739,168 | 9/1943 | Germany | 226/166 |

*Primary Examiner*—Allen N. Knowles
*Attorneys*—Arne I. Fors and Frank I. Piper

ABSTRACT: A Hitch Feed for advancing sheet and strip material comprising a novel support assembly for reciprocating one of a pair of novel transfer blocks relative to the other and a release mechanism for use with each of the transfer blocks for facilitating the insertion and removal of the workpiece.

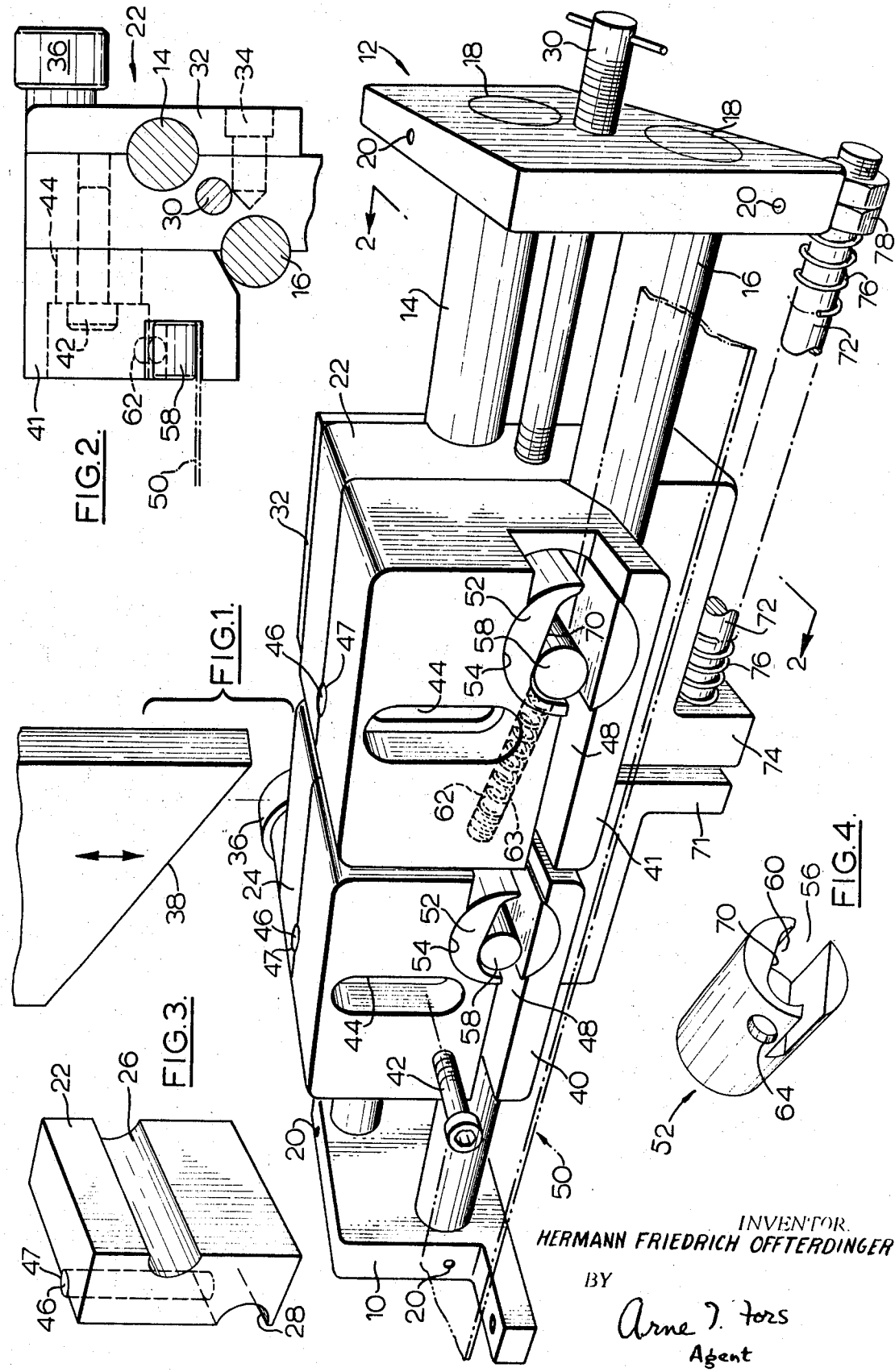

INVENTOR.
HERMANN FRIEDRICH OFFTERDINGER
BY
Arne J. Fors
Agent

HITCH FEED

This invention relates to a hitch feed and is particularly directed to a hitch feed for advancing sheet and strip material and the like workpieces to die blocks, shears and the like press-working equipment.

Conventional hitch feeds used in stamping for advancing workpieces to die blocks, for example, are prone to misalignment during operation due to the external forces applied to the hitch feed structure for actuating the feed mechanism. Also, advancement of the workpiece a predetermined distance frequently is not positive due to slippage of the components of the hitch feed, particularly as they become worn. These disadvantages inherent in conventional hitch feeds can result in a workpiece being fed to die blocks at an incorrect angle for proper operation of the dies or an insufficient length of workpiece may be fed to the dies resulting in the production of faulty stampings.

The thickness of the workpiece often varies along its length necessitating the hitch feed to be readily adjustable. However, conventional hitch feeders do not have an automatic adjustment which operates in a facile and dependable manner.

The strip or sheet material to be worked often is fed from a coil and, in the case of steel and the like rigid by resilient materials, usually retains some of the coil curvature in the form of waves. In that most hitch feeds can only receive planar strip or sheet material, material fed from a coil normally must be straightened before being introduced to the hitch feeder.

It is a principal object of the present invention, therefore, to provide a hitch feed which is simple in construction and positive and substantially trouble-free in operation.

It is another object of the invention to provide a hitch feed which consistently advances the workpiece a predetermined distance and maintains the workpiece in alignment with the die blocks.

And another object of the invention is the provision of a hitch feed which is automatically adjustable to variations in workpiece thickness.

And a further object of the invention is to provide a hitch feed which will adjust to variations in the plane of the workpiece, such as workpieces having a generally sinusoidal form fed from coils, when passing through the hitch feed.

These and other objects of the invention and the manner in which they can be attained will become apparent from the following detailed description of the drawings, in which:

FIG. 1 is a perspective view of the structure of the invention showing a workpiece in ghost lines;

FIG. 2 is an elevation, partly in section, taken along the line 2–2 of FIG. 1 showing a portion of the structure of the invention;

FIG. 3 is a perspective view of a slide-block component of the invention;

FIG. 4 is a perspective view of another component of the invention;

Like reference characters refer to like parts throughout the description of the drawings.

Figure 5:
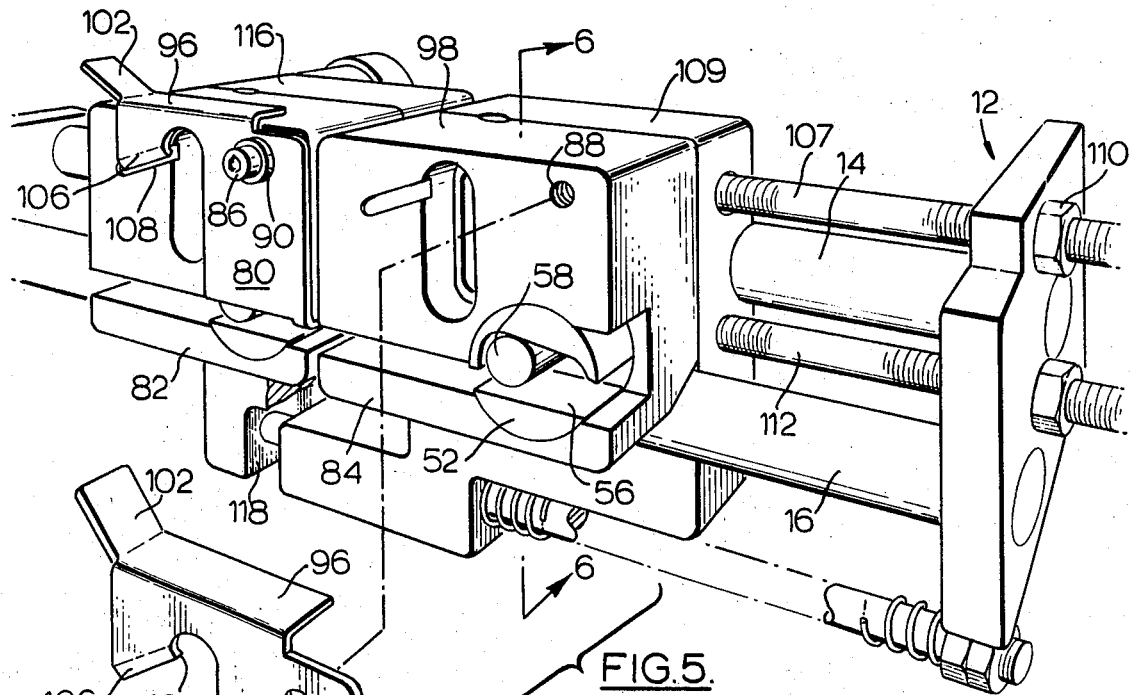
FIG. 5 is a perspective view, partly exploded, of another embodiment of the present invention.

With reference now to the drawings, the structure of the invention comprises a pair of spaced support members, mounting base 10 and end block 12, having guide rods 14, 16 extending therebetween from diagonal corners, as indicated most clearly in FIG. 1, such that rod 14 is higher than rod 16 and spaced laterally therefrom for reasons which will become apparent as the description proceeds. Guide rods 14, 16 are locked in openings 18 formed in the support members by set screws or the like securing means indicated by numeral 20.

A pair of slide blocks 22, 24 shown in FIGS. 1, 2 and 3 are mounted on guide rods 14, 16 for slidable movement thereon by the seating of guide rods 14, 16 in semicylindrical recesses 26, 28 formed lengthwise in the sides of blocks 22, 24. Screw 30 threaded through support member 12 is adapted to be rotated for advancement through support member 12 for abutment with slide block 22 for advancing said block to the left as shown in FIG. 1. A locking plate 32 secured to slide block 22 by a screw designated by numeral 34 in FIG. 2 is adapted to tighten plate 32 against block 22 such that guide rod 14 is tightly gripped therebetween to rigidly anchor block 22 from longitudinal movement on the guide rods.

Slide block 24 is slidably mounted on guide rods 14, 16 for longitudinal movement thereon. Slide block 24 has a cam follower 36 mounted on one side for engagement by cam 38 which is adapted for reciprocal vertical movement such that downward movement of cam 38 advances cam follower 36 to the left, as viewed in FIG. 1. The actuating mechanism for cam 38 is well known in the art and is not described herein.

Slide blocks 22, 24 have transfer blocks 40, 41 rigidly secured thereto by screws 42, one of which is shown axially separated from block 40, which pass through vertically elongated slots 44 formed transversely in each of blocks 40, 41. Screws 42 are threaded into blocks 22, 24 and permit vertical adjustment of blocks 40, 41 relative to blocks 22, 24. Transfer blocks 40, 41 are maintained in alignment with blocks 22, 24 by dowels 46 positioned in the holes 47 defined by opposed semicylindrical slots formed in the abutting faces of the respective slide and transfer blocks.

Each of blocks 40, 41 has a longitudinal slot 48 formed on one side for loosely receiving a workpiece which is shown by ghost lines and designated by numeral 50. A lock insert in the form of a cylindrical rod 52, shown most clearly in FIG. 4, is inserted in each of cylindrical openings 54 formed transversely in transfer blocks 40, 41 for rotational movement therein. Each of lock inserts 52 has a diametric slot 56 formed at one end for alignment with the respective axis of slot 48 formed in blocks 40, 41 such that workpiece 50 will freely pass therethrough. The upper surface defining one side of slot 56 is enlarged by tapered recess 60 to receive wedge rod 58 which is loosely seated for abutment with workpiece 50. Each of blocks 40, 41 has an inclined opening 62 (shown by ghost lines in block 41, FIG. 1) for receiving a compression spring 63 therein which is secured at one end to the block and biased at the other end against wedge rod 58 through opening 64 formed in each of lock inserts 52.

Slide block 24 has a bracket 71 secured to its underside to which is secured one end of elongated rod 72. Rod 72 is mounted for slidable travel in an opening in bracket 74 secured to the underside of slide block 22 and the rod free end carries a compression spring 76 which is adapted to abut bracket 74 at one end and nut 78 at the other end such that transfer block 40 secured to slide block 24 is continually biased in a direction toward transfer block 41 secured to block 22.

In operation, workpiece 50 is placed in slots 48 in transfer blocks 40, 41 and received in slots 56 of lock inserts 52. Wedge rods 58 are inserted within tapered recesses 60 for engagement by surface 70 of recess 60 and the upper surface of the workpiece under the bias of springs 63. Transfer blocks 40, 41 are raised and lowered relative to slide blocks 24, 22 by means of screws 42 for alignment of workpiece 50 with the die blocks, or the like working equipment, not shown. Slide block 22 is adjusted on guide rods 14, 16 by means of threaded bolt 30 and locked in place by means of locking plate 32. The position of slide block 22 determines the extreme right travel of slide block 24, as viewed in FIG. 1. Cam 38 is adjusted vertically to provide the desired movement of slide block 24 to the left, as viewed in FIG. 1, when cam 38 is at its maximum downward limit of travel. The amplitude of reciprocal movement of slide block 24 is thus determined by the location of slide block 22 and the amount of travel of cam 38 during engagement with cam follower 36.

During downward vertical travel of cam 38, cam follower 36 is engaged and advances slide block 24 to the left carrying transfer block 40 therewith. Wedge rod 58, which is biased to the right as viewed in FIG. 1, tightly engages workpiece 50 by its engagement with the workpiece and tapered surface 70 of recess 60 thereby positively advancing workpiece 50 therewith to the left; the workpiece freely moving through lock insert 52 of transfer block 41. Upon upward vertical movement of cam 38, compression spring 76 urges rod 72 to the right as viewed in FIG. 1 retracting block 40 therewith for engagement against block 41; the workpiece now freely moving through lock insert 52 of transfer block 40. Workpiece 50 is prevented from longitudinal movement to the right by engagement of wedge rod 58 in the lock insert 52 of transfer block 41 thereagainst. The next downward movement of cam 38 commences the next cycle for advancing workpiece 50.

Figure 6:
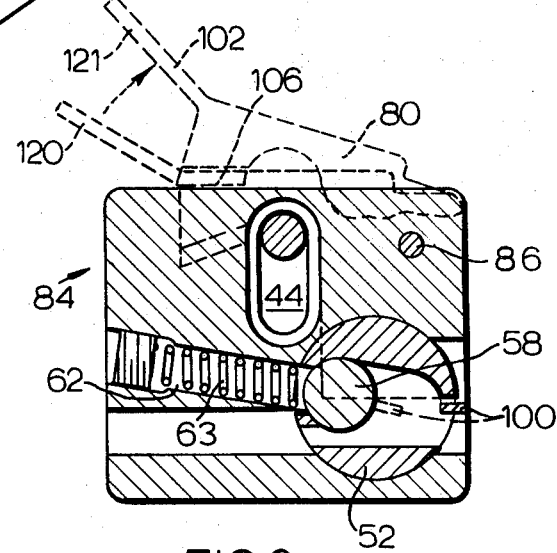
FIG. 6 is a longitudinal section taken along the line 6–6 of FIG. 5.

FIGS. 5 and 6 illustrate a release mechanism 80 pivotally mounted on each of transfer blocks 82, 84 by means of shoulder screws 86 threaded into holes 88 formed on the sides of said blocks. Disc springs 90 are held against planar portion 92 of each release mechanism 80 by shoulder 94 of screw 86 for reasons which will become evident as the description proceeds. Upper flange 96 of mechanism 80 is adapted to abut the upper surface 98 of blocks 82, 84 to locate the said release mechanism in its at rest position, as shown on transfer block 82. Projection 100, which is formed at a lower corner of planar portion 92 and is adapted to extend inwardly into slot 56, abuts wedge rod 58 and is urged to the right, as viewed in FIGS. 5 and 6, by the bias of compression spring 63 acting on rod 58 to pivot release mechanism 96 in a counterclockwise direction.

Release mechanism 80 has a tab 102 to facilitate manual manipulation of the mechanism, i.e. clockwise pivotal movement of the mechanism, and a cutaway portion designated by numeral 104 to permit access to screws 42 when the mechanism is in its at-rest position. Obliquely bent detent 106 is adapted to be seated in recess 108.

During operation of the hitch feed, wedge rods 58 are normally urged into contact with the workpiece by the bias of compression springs 63. To remove or insert a workpiece, release mechanism 80 is manually pivoted from its at-rest position as shown by broken lines 120 in FIG. 6 in a clockwise direction to the position indicated by ghost lines 121 to displace wedge rod 58 to the left by movement of projection 100 both of which are also in their displaced position by ghost lines, thereby releasing the engagement of the wedge rod with the workpiece or permitting a workpiece to be inserted into the slot 56.

Disc springs 90 permit lateral movement of release mechanism 80 and thus allow release of detent 106 during its upward movement. With reference now to FIG. 6, detent 106 is seated on the upper surface 98 of the blocks when tab 102 of mechanism 80 is released to facilitate removal or insertion of a workpiece. Lateral movement of the mechanism 80 away from the block releases detent 106 and the bias of spring 63 urges the release mechanism to its at-rest position as shown in FIG. 5.

FIG. 5 also shows a screw 107 threaded at one end into block 109 for engagement therewith and loosely passed through support member 12 at its other end. Nut 110 threaded onto screw 107 abuts the surface of support member 12 to lock block 109 from movement to the left, as viewed in FIG. 5, or provided adjustment of block 109 to the right in conjunction with adjustment of screw 112.

Slide block 116 has a bracket 118 formed integral therewith at one end and block 109 has a tubular sleeve formed integral therewith permitting the free passage of rod 72 therethrough.

The present invention provides a number of important advantages. Each of the slide blocks is seated on the guide rods in such a way that the torque created by vertical movement of the cam against the cam follower cannot move said slide blocks out of vertical alignment. This obviates the need for dovetail or T-slide guides which are expensive to machine and are prone to wear and misalignment. The transfer devices of the hitch feed provides positive engagement with a workpiece to substantially obviate slippage or other undesired movement of the workpiece and readily compensates for variations in the thickness of the workpiece. The transfer devices also automatically track and adjust for changes in the plane of the workpiece as it is advanced through the hitch feed to obviate the need for intermediary straightening devices.

While the description has proceeded with guide rods 14, 16 locked in support members 10, 12 and block 22 adapted to be locked onto said guide rods with block slidably mounted on said guide rods, it will be understood guide rods 14, 16 (lengthened as necessary) can be slidably mounted within support members 10, 12, block 22 slidably mounted on said guide rods but held stationary by screw 30, and block 24 locked onto said guide rods such that actuation of cam follower 36 by cam 38 moves block 24 with the guide rods to the left, as viewed in FIG. 1, and subsequent release of cam follower 36 permits retraction of block 24 by the bias of spring 76.

I claim:

1. A hitch feed for advancing workpieces which comprises a pair of transfer blocks and means for advancing and retracting one transfer block relative to the other, each of said transfer blocks comprising a cylindrical lock insert journaled for rotational movement in the transfer block transversely relative to the longitudinal axis of the workpiece, a diametric slot formed at one end of the lock insert for loosely receiving a portion of the workpiece therein, said slot having one surface with a tapered recess, and a wedge rod mounted within said diametric slot in said tapered recess such that said rod is adapted to be wedged between the slot recess surface and the surface of the workpiece for tightly gripping and advancing the workpiece by movement of the transfer block in one direction only.

2. In a hitch feed as claimed in claim 1, each of said transfer blocks having an oblique opening formed therein for communication with the lock insert, the lock insert having an opening extending from its periphery to the tapered recess for alignment with said oblique opening, and biasing means disposed within said aligned openings for abutment with the wedge rod to urge said wedge rod towards the narrow end of the tapered recess.

3. In a hitch feed as claimed in claim 2, each of said transfer blocks having a longitudinal slot formed on one side substantially in alignment with the lock insert diametric slot for receiving a workpiece therein.

4. In a hitch feed as claimed in claim 3, said means for advancing and retracting one transfer block relative to the other comprising a pair of spaced support members, a pair of guide rods supported by said support members in spaced, parallel relationship such that one of said guide rods is higher than the other and is spaced laterally therefrom, a pair of slide blocks each having semicylindrical recesses formed one on each side thereof adapted to receive said guide rods therein for longitudinal travel of said slide blocks on said guide rods, means for locking one of said slide blocks to a guide rod, a cam follower formed on one of said slide blocks on the side receiving the upper guide rod for actuation by a cam for movement of one slide block away from the other slide block, means for normally biasing the movable slide block in a direction towards the other slide block, and means for rigidly securing one of said transfer blocks to a slide block for vertical adjustment thereon.

5. In a hitch feed as claimed in claim 4, said means for normally biasing one said slide block in a direction towards the other slide block comprising a bracket depending from each of the slide blocks, an elongated rod rigidly secured at one end to one bracket and slidably mounted in the other bracket, a detent formed on the other end of the elongated rod, and biasing means adapted to be compressed between one of said brackets and said detent means such that said blocks normally are urged towards each other.

6. A transfer block for advancing a workpiece comprising a cylindrical lock insert journaled for rotational movement in the transfer block transversely relative to the longitudinal axis of the workpiece, a diametric slot formed at one end of the lock insert for loosely receiving a portion of the workpiece therein, said slot having one surface with a tapered recess, and a wedge rod mounted within said diametric slot in said tapered recess such that said rod is adapted to be wedged between the slot recess surface and the surface of the workpiece for tightly gripping and advancing the workpiece by movement of the transfer block in one direction only.

7. In a transfer block as claimed in claim 6, an oblique opening formed therein for communication with the lock insert, the lock insert having an opening extending from its periphery to the tapered recess for alignment with said oblique opening, and biasing means disposed within said aligned openings for abutment with the wedge rod to urge said wedge rod towards the narrow end of the tapered recess.

8. In a transfer block as claimed in claim 7, said transfer block having a longitudinal slot formed on one side substantially in alignment with the lock insert diametric slot for receiving a workpiece therein.

9. A support for transfer blocks comprising a pair of spaced support members, a pair of guide rods supported by said support members in spaced, parallel relationship such that one of said guide rods is higher than the other and is spaced laterally therefrom, a pair of slide blocks each having semicylindrical recesses formed one on each side thereof adapted to receive said guide rods therein for longitudinal travel of said slide blocks on said guide rods, means for locking one of said slide blocks to a guide rod, a cam follower formed on one of said slide blocks on the side receiving the upper guide rod for actuation by a cam for movement of one slide block away from the other slide block, means for normally biasing the movable slide block in a direction towards the other slide block, and means for rigidly securing one of said transfer blocks to a slide block for vertical adjustment thereon.

10. In a support as claimed in claim 9, said means for normally biasing one slide block in a direction towards the other slide block comprising a bracket depending from each of the slide blocks, an elongated rod rigidly secured at one end to one bracket and slidably mounted in the other bracket, a detent formed on the other end of the elongated rod, and biasing means adapted to be compressed between one of said brackets and said detent means such that said blocks normally are urged towards each other, and means for rigidly securing one of said transfer blocks to a slide block for vertical adjustment thereon.

11. In a hitch feed as claimed in claim 2, a release mechanism operatively connected to each transfer block comprising means for pivotally connecting the release mechanism to the transfer block, a flange formed on the release mechanism for engaging a surface of the transfer block for limiting pivotal movement of the release mechanism in one direction, and a projection formed on the release mechanism adapted to extend into the slot formed in the lock insert for engagement with the wedge rod such that pivotal movement of the release mechanism in the opposite direction releases engagement of the wedge rod with the workpiece.

12. In a transfer block as claimed in claim 6, a release mechanism operatively connected to said transfer block comprising means for pivotally connecting the release mechanism to the transfer block, a flange formed on the release mechanism for engaging a surface of the transfer block for limiting pivotal movement of the release mechanism in one direction, and a projection formed on the release mechanism adapted to extend into the slot formed in the lock insert for engagement with the wedge rod such that pivotal movement of the release mechanism in the opposite direction releases engagement of the wedge rod with the workpiece.

13. In a release mechanism as claimed in claim 12, a detent formed on the release mechanism for engaging a surface of the transfer block to maintain the wedge rod out of engagement with the workpiece.

14. In a release mechanism as claimed in claim 12, a detent formed on the release mechanism for engaging a surface of the transfer block to maintain the wedge rod out of engagement with the workpiece, said means for pivotally connecting the release mechanism to a transfer block adapted to permit lateral movement of the said release mechanism for disengagement of the detent from the block surface.

15. A release mechanism operatively connected to a transfer block having a wedge rod biased into engagement with a workpiece comprising means for pivotally connecting the release mechanism to the transfer block, a flange formed on the release mechanism for engaging a surface of the transfer block for limiting pivotal movement of the release mechanism in one direction, and a projection formed on the release mechanism adapted to engage the wedge rod such that pivotal movement of the release mechanism in the opposite direction releases engagement of the wedge rod with the workpiece.

16. In a release mechanism as claimed in claim 15, a detent formed on the release mechanism for engaging a surface of the transfer block to maintain the wedge rod out of engagement with the workpiece.

17. In a release mechanism as claimed in claim 15, a detent formed on the release mechanism for engaging a surface of the transfer block to maintain the wedge rod out of engagement with the workpiece, said means for pivotally connecting the release mechanism to a transfer block adapted to permit lateral movement of the said release mechanism for disengagement of the detent from the block surface.